(12) United States Patent
Martin et al.

(10) Patent No.: US 7,079,536 B1
(45) Date of Patent: Jul. 18, 2006

(54) METHOD TO PERFORM CENTRAL CONTROL, A LINE TERMINATOR AND AN ELEMENT CONTROLLER REALIZING SUCH A METHOD AND A TREE-LIKE NETWORK INCLUDING SUCH A LINE TERMINATOR AND AN ELEMENT CONTROLLER

(75) Inventors: Claire Martin, Ukkel (BE); Hans Slabbinck, Gent (BE); Ingrid Zulma Benoit Van De Voorde, Wolvertem (BE); Peter Johannes Vetter, Antwerp (BE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/513,169

(22) Filed: Feb. 25, 2000

(30) Foreign Application Priority Data

Mar. 17, 1999 (EP) .................................. 99400656

(51) Int. Cl.
   *H04L 12/28* (2006.01)
   *H04J 1/00* (2006.01)
   *H04J 14/00* (2006.01)

(52) U.S. Cl. ...................... 370/392; 370/420; 370/485; 398/45; 398/60; 398/166

(58) Field of Classification Search ................ 370/431, 370/437, 441, 442, 443, 444, 461, 462, 458, 370/395.4, 392, 395.1, 485–486, 488–490; 359/349; 398/180, 45–48, 60, 68, 73, 79
See application file for complete search history.

(56) References Cited

U.S. PATENT DOCUMENTS 5,754,319 A * 5/1998 Van De Voorde et al. .. 359/349
5,917,822 A * 6/1999 Lyles et al. ............... 370/395.4

(Continued)

FOREIGN PATENT DOCUMENTS

| EP | 0 681 378 A1 | 11/1995 |
| EP | 0 765 045 A1 | 3/1997 |
| EP | 0 869 634 A2 | 10/1998 |

OTHER PUBLICATIONS

Telecommunication Standardization Sector of ITU International Telecommunication Union in the G.983.1 Standard of Oct. 1998 Series G: Transmission of Systems and media, Digital Systems and Networks: Digital sections and digital line systems—Optical line systems for local access networks: Broadband Optical Access Systems Based on Passive Optical Networks (PON).

*Primary Examiner*—Seema S. Rao
*Assistant Examiner*—Melanie Jagannathan
(74) *Attorney, Agent, or Firm*—Sughrue Mion, PLLC

(57) ABSTRACT

The present invention concerns a method to perform central control of in-line element (Ei) in a tree-like network by a line terminator (LT). A plurality of network terminators (NT1, NT2, . . . , NTi, . . . , NTn) are coupled via one or more of such in-line elements (Ei) to the line terminator (LT) by dedicated branches and by a common branch, respectively. The method includes the steps of:

determining by the line terminator (LT) a first plurality of bits (A) according to an identification of a selected element (SEL-E) and a second plurality of bits (B) according to an identification of a locally predefined function (SEL-F) whereby the selected element (SEL-E) has been selected by the central control out of the in-line elements (Ei) in order to execute its locally predefined function (SEL-F); and including by the line terminator (LT) in a grant message (G) the first plurality of bits (A) and the second plurality of bits (B);

forwarding the grant message (G) by the line terminator (LT) to the in-line elements (Ei) in order to thereby impose execution of the locally predefined function (SEL-F) according to the second plurality of bits (B) upon the selected element (SEL-E) according to the first plurality of bits (A).

18 Claims, 1 Drawing Sheet

U.S. PATENT DOCUMENTS 6,201,622 B1 * 3/2001 Lobbett et al. ............. 398/180
6,229,634 B1 * 5/2001 Smith et al. ................ 398/208
6,411,410 B1 * 6/2002 Wright et al. ................. 398/79
6,463,075 B1 * 10/2002 Hoebeke ..................... 370/458

* cited by examiner

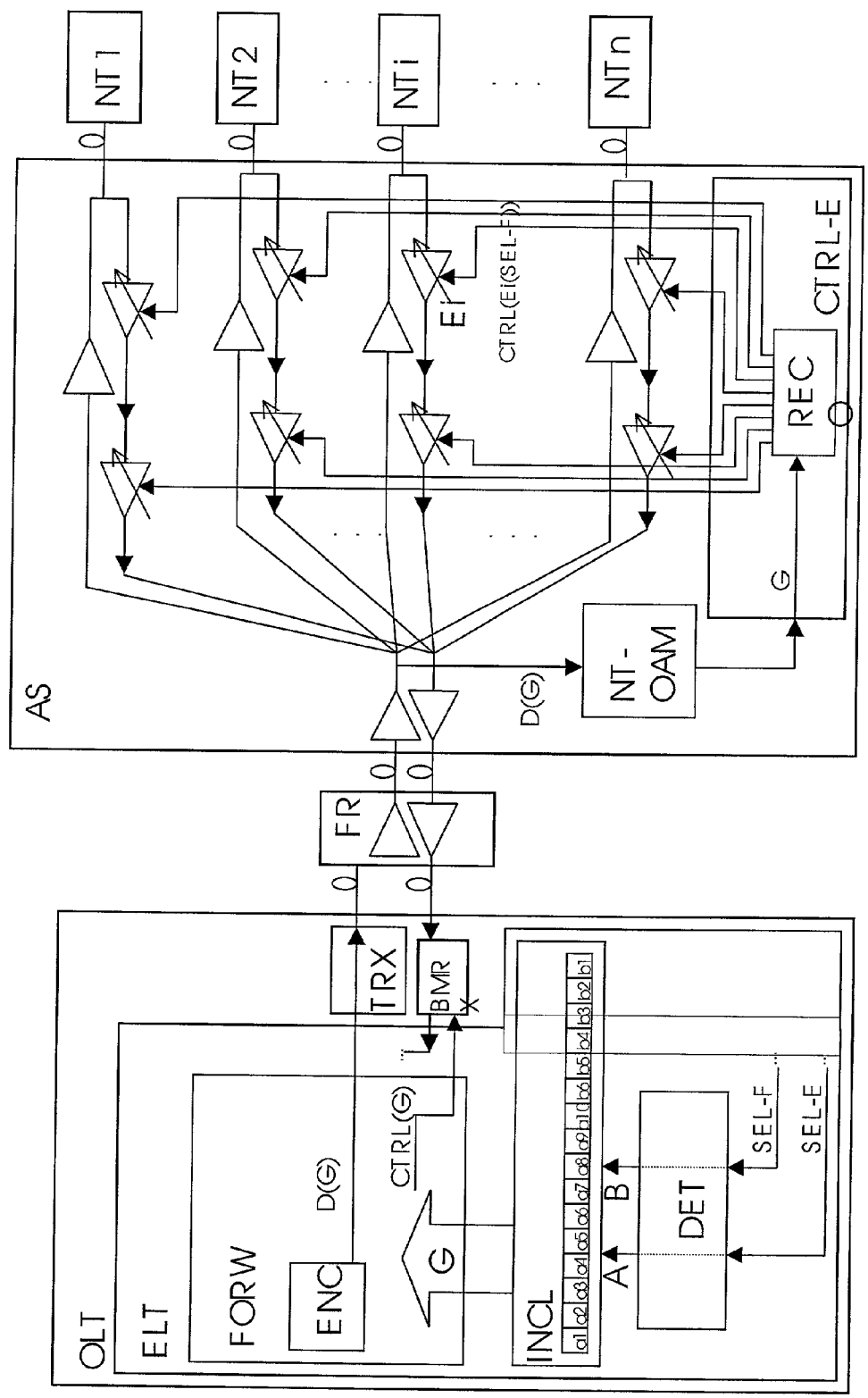

METHOD TO PERFORM CENTRAL CONTROL, A LINE TERMINATOR AND AN ELEMENT CONTROLLER REALIZING SUCH A METHOD AND A TREE-LIKE NETWORK INCLUDING SUCH A LINE TERMINATOR AND AN ELEMENT CONTROLLER

BACKGROUND OF THE INVENTION

The present invention relates to a method to perform central control to a line terminator and an element controller that are realizing such a method and to a tree-like network.

Such a tree-like network is already known in the art e.g. from The published European Patent Application, published at 26.03.1997, with the title "Arrangement for amplifying and combining optical signals, and method for upstream transmission realized therewith" with publication number EP 0 765 045 A1. Therein a tree-like optical network is described. The tree-like network consists of the upstream cascade connection of dedicated branches, a combiner arrangement and a common branch whereby a plurality of network units, called hereafter network terminators are coupled to a line terminator.

A so called grant is distributed by the line terminator to the different network terminators in order to permit one or more network terminators to react on the grant, according to an identification included in the grant ant to transmit an upstream burst also called upstream information signal.

Indeed, it is described by the Telecommunication Standardization Sector of ITU International Telecommunication Union in the G.983.1 standard of 10/98 with title "Series G: Transmission Systems and media, Digital Systems and Networks: Digital sections and digital line systems—Optical line systems for local and access networks: Broadband Optical Access Systems Based On Passive Optical Networks (PON)" at page 6, paragraph 4 of Definitions that an optical line terminator controls each upstream transmission from the optical network units by sending a permission. A grant, also called a permit, is a permission to transmit an upstream cell of an optical network terminator when an optical network terminator receives its own grant. Furthermore at paragraph 8.3.5.3.5. Grants, pages 36 to 37, the different types of grants are described.

As it is described in the above mentioned application, at the first column, lines 23 to 31, these known networks are demanding optical amplifiers in the dedicated branches in order to support the required optical power-budget. Furthermore at lines 49 to 52 it is described that also optical switches are required in these branches. The "in-line elements" that are used in the claims of the present application are e.g. such an optical amplifier or an optical switch. Indeed, these elements are included along the downstream transmission path of the downstream information signals distributed by the line terminator to the plurality of network terminators and along the upstream transmission path of the upstream information signals being transmitted by one of the network terminators.

These in-line elements must perform predefined functions at predefined time moments. In this way a semiconductor optical amplifier e.g. an integration of such an optical amplifier and an optical switch needs to be switched on/off at predefined time moments and needs to set a predefined gain at other predefined time moments. Another in-line element is a burst mode receiver being coupled on the common branch to the line terminator. It has to be remarked that in the event when the tree-like network is an optical tree-like network such a burst mode receiver is usually included in the optical line terminator and coupled to the electrical line terminator. The burst mode receiver must detect at predefined time moments certain activity form the network terminators and needs to perform at other predefined time moments automatic gain control for the different network terminators.

It is also described in the referred application that a possible way to control the optical switches by the line terminator i.e. on/off instruction is realized by capturing downstream grant information being downstream transmitted by the line terminator to the network terminators. Although that this grant information, that includes as described in the above mentioned standard the network terminator identification, is used to determine whether an upstream information signal will be present or will not be present during a predetermined time interval for a particular optical switch, i.e. during normal operation mode of a network terminator, such a method is not sufficient to perform a total control of all the in-line elements during e.g. a preparation phase of the network terminators and other network elements.

In order to perform the required functionality's by these in-line elements at the predefined time moments different approaches are possible. Indeed a possible method is e.g. a central control performed by the line terminator with transmission of control signals between the line terminator and the in-line elements. However, in networks with high splitting factor and many different in-line elements such a solution would require many additional control signals and extra overhead.

SUMMARY OF THE INVENTION

An object of the present invention is to provide a method to perform central control of the above known type that is suited to perform a total central control of the in-line elements but that works according to an overhead efficient way without the use of extra control signals.

According to the invention, this object is achieved by the method to perform central control, the line terminator and the element controller realizing such a method, and a tree-like network including such a line terminator and such an element controller, as described hereinafter.

A first aspect of the invention is a method to perform central control of an in-line element in a tree-like network by a line terminator included in said network together with a plurality of network terminators of which at least one network terminator is coupled via said in-line element to said line terminator by dedicated a branch and a common branch, respectively, wherein the method includes the steps of: (i) determining by said line terminator a first plurality of bits according to an identification of a selected element and a second plurality of bits according to an identification of a locally predefined function, said selected element being selected out of a set of in-line elements comprising at least said in-line element in order to execute said locally predefined function; (ii) including by said line terminator in a grant message said first plurality of bits and said second plurality of bits; and (iii) forwarding said grant message by said line terminator to said element in order to thereby impose execution of said locally predefined function according to said second plurality of bits upon said selected element according to said first plurality of bits.

According to a second aspect of the invention, there is provided a line terminator to perform central control of a plurality of in-line elements in a tree-like network, said tree-like network including a plurality of network terminators being coupled via said plurality of in-line elements to said line terminator by dedicated branches and a common branch, respectively, wherein said line terminator includes means for performing each of the above method steps.

According to a further aspect of the invention, there is provided an element controller associated to a selected element of a set of in-line elements in a tree-like network, to impose execution of a locally predefined function upon said selected element under the central control of a line terminator, said line terminator being coupled via said set of in-line elements comprising said selected element to a plurality of network terminators by a common branch and dedicated branches, respectively, wherein said element controller is downstream coupled to said line terminator and includes recognizing means being coupled to an input of said element controller to receive a grant message as described above, and said recognizing means is further included to recognize in said grant message said first plurality of bits and said second plurality of bits and to generate upon said recognition a control signal for a selected element in order to thereby impose execution of said locally predefined function upon said selected element.

Finally, the invention is directed to a tree-like network including either or both of a line terminator and an element controller as described above.

Indeed, the invention is based on the insight that by defining in a grant message a first plurality of bits according to an identification of a selected element and a second plurality of bits according to an identification of a locally predefined function whereby the selected element is selected out of the in-line elements in order to execute the locally predefined function. The line terminator in this way enabled to perform a central control of the in-line elements without using extra control signals. The inclusion in a grant message of a combination of an identification of a selected element and a few extra bits that indicate a locally predefined function, is sufficient to perform a total control, not only of the network terminators but also of the in-line elements during normal operation mode of the network terminators but also during other kinds of operation mode such as e.g. preparation phase of the different network elements, initialization of different network elements, verification procedures and gain setting procedures. By distributing the grant message into the network to the different network terminators the grant message is also forwarded to the in-line elements whereby the in-line elements are enabled to recognize an identification or not. When an in-line element recognizes its identification, it means that it is the selected element, one of its locally predefined functions is identified according to the second plurality of bits and is in this way imposed by the line terminator upon the selected element in order to be executed.

It has to be remarked that the expression "locally" means that the second plurality of bits has a local significance. This means that a second plurality of bits with a predefined value e.g. a first predefined value can have a different significance for different in-line elements. For example, in the event when a semiconductor optical amplifier recognizes its identification, it reacts on a second plurality of bits with a first predefined value by "switching on with a predefined default gain". On the other hand, when a burst mode receiver recognizes its identification, it reacts on a second plurality of bits with the same first predefined value by "starting with activity detection".

A further remark is that although the first plurality of bits identifies a selected element and the second plurality of bits identifies a locally predefined function, the present invention is not limited to such a sequence but the meaning of first plurality of bits an second plurality of bits are interchangeable.

Furthermore, it has to be remarked that the first plurality of bits can include a network terminator identifier or a branch identifier. Indeed, it is possible to include e.g. the identification of a network terminator in the first plurality of bits in order to address, besides the network terminator, an in-line element of the branch of this network terminator. In combination with the values of the second plurality of bits, the addressed in-line element i.e. the selected element knows what kind of function is expected to be executed. On the other hand, it is also possible to include in the first plurality of bits e.g. the identification of the branch of an in-line element in order to address one or more in-line elements of this branch. In the event of such a kind of implementation it is not necessary to also include an identification of a network terminator. Since according to the working of the grant procedures, a particular network terminator only reacts on a grant message when its own identity is included, the inclusion of a branch identifier instead of a network terminator identifier does not disturb the working of these grant procedures. Furthermore, it has to be remarked that although an implementation with a network terminator identifier or an implementation with a branch identifier might require a different number of bits of first plurality of bits e.g. a first predefined number of bits or a second predefined number of bits, both implementations can be realized by the same central control performed by the same line terminator. Indeed, it is sufficient to assign to one or more predefined bits of the second plurality of bits a locally predefined function according to the value of these bits e.g. "looking at a first predefined number of bits in order to interpret the first plurality of bits" or "looking at a second predefined number of bits in order to interpret the first plurality of bits". In this way the different network elements i.e. the network terminators and the in-line elements will first look at these bits of the second plurality of bits and thereafter e.g. interpret a first plurality of bits with a first predefined number or interpret a first plurality of bits with a second predefined number of bits, or e.g. decide to do nothing at all.

As already described above, the step of forwarding the grant message to the different in-line elements can be implemented in different ways.

A possible way is comprising the grant message by the line terminator in a downstream signal, downstream distributing the downstream signal to the plurality of network terminators and capturing the grant message, out of the downstream signal, in order to forward the grant message to an element controller associated to such an in-line element. The element controller interprets the grant message and imposes, according to the first plurality of bits and the second plurality of bits, execution of a locally predefined function upon the selected element. This will become clear by means of the following example in an optical tree-like network. Capturing downstream grant information is usually realized in an optical tree-like network by a network terminator for operation and maintenance functions. Such a network terminator for operation and maintenance functions is downstream coupled to the line terminator by means of an optical tap. A small part of the power-budget of the downstream signal is deviated to the network terminator for operation and maintenance. The network terminator for operation and maintenance functions extracts the grant message from the downstream signal and forwards it to an in-line element controller. Such an in-line element controller is associated to one or more in-line elements in order to control them according to the grant messages imposed by the line terminator. It is clear that such an element controller can be implemented according to a distributed way or according to a centralized way. In this way an in-line element can include its own element controller. On the other hand an element controller can be associated to a plurality of network elements and be a stand-alone device.

Another way of forwarding the grant message to an in-line element is directly transmitting the grant message to the in-line element. This is for example realized for a burst mode receiver of an optical network that receives the grant message directly from the electrical line terminator.

As it is already mentioned above, a possible implementation of such an in-line element is a switchable amplifier for amplifying upstream transmitted signals transmitted by one of the network terminators.

Another possible in-line element is a burst mode receiver in an optical network. The element controller associated to the burst mode receiver is described in claim 8. It has to be remarked that such a burst mode receiver usual includes its associated element controller.

BRIEF DESCRIPTION OF THE DRAWINGS

The above and other objects and features of the invention will become more apparent and the invention itself will be best understood by referring to the following description of an embodiment taken in conjunction with the accompanying drawing wherein a tree-like network is shown.

DETAILED DESCRIPTION OF THE INVENTION

Referring to the FIGURE, it is preferred for this particular embodiment to describe a tree-like optical network. The optical network includes an electrical line terminator ELT and a plurality of network terminators NT1, NT2, ..., NTi, ..., NTn. The electrical line terminator ELT is coupled to the plurality of network terminators NT1, NT2, ..., NTi, ..., NTn via a common branch and dedicated branches.

The common branch and the dedicated branches are including in-line elements. In this way, the common branch of this particular embodiment includes in-line elements such as a feeder/repeater FR and a burst mode receiver BMRX and each one of the dedicated branches includes also some in-line elements e.g. Ei included in the upstream branch from the network terminator NTi. In order not to overload the Figure, only the in-line element Ei that will be used in a further paragraph is referred to and other in-line elements, similar to the Ei in-line element, are shown in the Figure but are not named.

The burst mode receiver BMRX and the electrical line terminator ELT are included in an optical line terminator OLT and are coupled by an electrical link. Furthermore the optical line terminator OLT includes a transmitter TRX.

It has to be remarked that for the downstream transmission of the electrical signals from the electrical line terminator ELT, the signals are first converted into optical signals before being transmitted and, after transmission, the optical signals are again converted into electrical signals at the network terminators. However, this goes beyond the aim of the invention and is not here in details described.

The electrical line terminator ELT includes a determiner DET, an including means INCL and a forwarder FORW. The determiner DET is coupled to the including means INCL that on its turn is coupled to the forwarder FORW. The forwarder FORW includes an encapsulator ENC. The encapsulator ENC is coupled to the including means INCL and to the transmitter TRX. The transmitter TRX is coupled to an output of the optical line terminator ELT. This output of the optical line terminator is coupled to the downstream transmission link of the common branch. The forwarder FORW is furthermore coupled via another output to the burst mode receiver BMRX.

The electrical line terminator performs a central control of the network terminators NT1, NT2, ..., NTi, ..., NTn but also of the in-line elements e.g. the in-line element Ei, the feeder repeater FR and the burst mode receiver BMRX. This means that at predefined time moments a particular network element must execute a particular function under the central control of the electrical line terminator ELT. In order to realize this central control, a grant message G is defined that includes a first plurality of bits A and a second plurality of bits B. The first plurality of bits determines the particular element that must execute a particular function and the second plurality of bits determines the type of function that must be executed by the network element. In this way, a selected in-line element, called selected element SEL-E must execute a particular locally predefined function SEL-F.

The determining means DET determines a first plurality of bits A according to an identification of the selected element SEL-E and determines a second plurality of bits B according to an identification of the locally predefined function SEL-F. The first plurality of bits A e.g. (a1, a2, a3, a4, a5, a6, a7, a8, a9, a10) includes a number of bits that can vary in function of the identification of the selected element and the number of bits of the second plurality of bits B e.g. (b6, b5, b4, b3, b2, b1) can also vary in function of the kind of function to be executed. However, according to this particular embodiment, the total number of bits of the first plurality of bits A plus the second plurality of bits B is constant. Hereby, the information that the first plurality of bits contains a predefined number of bits is included in the values of one or more predefined bits of the second plurality of bits i.e. the determination of the kind of identification used by the line terminator is included in the second plurality of bits B.

According to this particular embodiment the values of the bits b1 and b2 are determining that the first plurality of bits A counts:

10 bits e.g. (a1, a2, a3, a4, a5, a6, a7, a8, a9, a10) thereby identifying a network terminal identifier and whereby the second plurality of bits B counts 6 bits e.g. (b6, b5, b4, b3, b2, b1); or only 7 bits e.g. (a1, a2, a3, a4, a5, a6, a7) thereby identifying a branch identifier and whereby the second plurality of bits B counts 9 bits e.g. (b9, b8, b7, b6, b5, b4, b3, b2, b1).

The including means INCL includes the first plurality of bits A and the second plurality of bits B into the grant message G. This grant message G is provided to the forwarder FORW. The forwarder FORW forwards the grant message to the in-line elements in order to impose execution of the locally predefined function SEL-F according to the second plurality of bits upon the selected element SEL-E according to the first plurality of bits. The forwarder FROW realizes this in two different ways. Since one of the in-line elements is the burst mode receiver BMRX that is included also in the optical line terminator OLT beside the electrical line terminator ELT, an electrical signal that includes the grant message G is sent directly to the burst mode receiver BMRX. Furthermore, in order to reach the in-line elements which are located at distributive places in the tree-like network, the grant message G is encapsulated by the encapsulator ENC in a downstream signal D(G)). This downstream signal is forwarded to the transmitter TRX that on its turn distributes the downstream signal D(G)) into the network towards the different network terminators NT1, NT2, ..., NTi, ..., NTn. How a locally predefined function is now imposed upon one of the in-line elements located in the network will be explained in a further paragraph.

For this particular embodiment, the in-line element Ei is a semiconductor optical amplifier. As it is described in a previous paragraph, the in-line element Ei must perform predefined functions. In this way, the semiconductor optical amplifier must be switched on and off at predefined time moments in order to avoid amplified spontaneous emission of noise when no signal is transmitted over the dedicated branch. Furthermore the semiconductor optical amplifier must set a predefined gain at other predefined time moments in order to amplify a present signal being transmitted by the dedicated network terminator NTi.

It also has to be remarked that the common branch and the dedicated branches are partly bidirectional and are partly separated in downstream and upstream transmission direction. The description of the exact places of the transmission lines where they are bidirectional or unidirectional goes beyond the aim of the present invention. Therefor this is not described in further detail. The aim is that the tree-like network includes in-line elements.

The in-line element Ei is included in an amplifier/splitter AS of the tree-like network. This amplifier/splitter AS is coupled between the electrical line terminator ELT and each one of the plurality of network terminators NT1, NT2, NTi, ..., NTn. The amplifier/splitter AS includes a splitting point of the downstream transmission direction and a combining point of the upstream transmission direction of the tree-like network. Furthermore the amplifier/splitter AS includes an element controller CTRL-E and an operation and maintenance network terminator OAM-NT. The operation and maintenance network terminator OAM-NT is downstream coupled to the electrical line terminator ELT via the common branch and an optical tap (not shown) located before the downstream splitting point. Furthermore the element controller CTRL-E is coupled to some in-line elements of the dedicated branches like e.g. to Ei.

The element controller CTRL-E includes a recognizer RECO. The recognizer RECO is downstream coupled to an input of the element controller CTRLE-E i.e. coupled to the optical tap. The recognizer RECO is furthermore coupled to the different in-line elements.

The element controller CTRL-E is included to control the different in-line elements included in the amplifier/splitter AS. In stead of each in-line element having its own element controller, it is preferred to include in the amplifier/splitter AS one centralized element controller CTRL-E. This means that in the event when a locally predefined function of a particular in-line element e.g. Ei must be executed by the in-line element under the central control of the electrical line terminator ELT, this execution is forwarded by the element controller CTRL-E to the particular in-line element Ei. The operation and maintenance network terminator OAM-NT captures the downstream signal D(G) that was transmitted into the network by the electrical line terminator ELT and extracts the grant message G from the downstream signal D(G) and forwards this grant message G to the recognizer RECO. The recognizer RECO interprets the grant message G. In the event when in the first plurality of bits A an identification of a network terminator identifier or an identification of a branch identifier is included upon which one of its associated in-line elements needs to react, the recognizer RECO creates a control signal CTRL(Ei(SEL-F)) and forwards this control signal CTRL(Ei(SEL-F)) to the related in-line element i.e. the selected in-line element e.g. Ei. The control signal CTRL(Ei(SEL-F)) furthermore includes the identification of the locally predefined function SEL-F according to the interpretation of the second plurality of bits B. In this way the selected function SEL-F is imposed by the element controller CTRL-E upon the in-line element Ei by the control signal CTRL(Ei(SEL-F)) under the impulse of the central control of the electrical line terminator ELT.

The working of the method of the invention will now be described by means of an example that describes the actual working of the central control system during a predefined time period.

Presume the situation that according to the central control system an activity detection on the dedicated branch of the network terminator NTi must be performed. This implies that:

the network terminator NTi must transmit at a predefined time moment a predefined physical layer operation and maintenance cell, called PLOAM cell, to the electrical line terminator ELT; and that the in-line element i.e. semi-conductor optical amplifier of this dedicated branch i.e. Ei must be switched on with a maximum gain when the transmitted PLOAM cell passes the amplifier i.e. a locally predefined function of the in-line element Ei; and that the burst mode receiver BMRX must start activity detection with a default gain by the time when the PLOAM cell will arrive at the optical line terminator OLT i.e. a locally predefined function of the burst mode receiver BMRX.

In order to perform these different functions by the different network elements a grant message G is created. Since according to the present example, at this stage of the procedures, the network terminator identifier has not been assigned yet by the electrical line terminator ELT, the branch identifier of the dedicated branch of the network terminator NTi is used in order to determine the first plurality of bits A. Therefor the determiner DET determines the values for the bits b1 and b2 according to the predetermined values associated to the function looking to only 7 bits for the first plurality of bits in order to interpret the first plurality of bits. Indeed, this branch identifier might be an identification as well for the network terminator NTi as for the in-line element Ei on the branch and for the burst mod receiver. Presume that the determiner DET determines the first plurality of bits equal to A (a1, a2, a3, a4, a5, a7). According to the identifications of the locally predefined functions e.g. SEL-F the second plurality of bits B is determined. Presume that the determiner DET determines the second plurality of bits equal to B (b9, b8, b7, b6, b5, b4, b3, b2, b1). This means that the second plurality of bits B (b9, b8, b7, b6, b5, b4, b3, b2, b1) has a local significance for the network terminator NTi in order to execute its functions of "transmitting a PLOAM cell", for the in-line element Ei in order to execute its function "switching on with a maximum gain" and for the burst mode receiver BMRX in order to execute its function "starting activity detection with default gain".

The first plurality of bits A and the second plurality of bits B are provided to the including means INCL and are included in a grant message G. The grant message is provided to the forwarder FORW. The forwarder FORW forwards the grant message by means of an electrical signal to the burst mode receiver BMRX and furthermore the encapsulator ENC encapsulates the grant message G also in a downstream signal D(G). It has to be understood that the grant message G is temporarily stored in a memory whereby as a consequence it can be used twice by reading it out of this memory, but this goes beyond the aim of the invention. The aim is that the grant message is forwarded to as well the burst mode receiver BMRX as to the encapsulator ENC. The encapsulator ENC provides the downstream signal to the transmitter TRX that transmits the downstream signal D(G) into the tree-like network.

Upon reception of the electrical signal the burst mode receiver BMRX is aware of the fact that it has to execute its function "starting activity detection". The burst mode receiver BMRX is put in such a mode i.e. ready to receive a signal.

On the other hand, the operation and maintenance network terminator OAM-NT receives via the tap the downstream signal D(G). The grant message is extracted from the downstream signal and the extracted grant message G is provided to the recognizer RECO that interprets the bits b1 and b2. According to the values of these bits, the recognizer RECO knows that it only has to look to the first 7 bits of the grant message G in order to interpret the first plurality of bits A (a1, a2, a3, a4, a5, a7). The recognizer RECO recognizes the branch identification of the in-line elements Ei and generates a control signal for this in-line element Ei. According to the interpretation of the second plurality of bits B (b9, b8, b7, b6, b5, b4, b3, b2, b1) the recognizer RECO imposes upon the in-line element Ei the function "switching on with a maximum gain at a predefined time moment". Therefor an identification to this function is included in the control signal CTRL(Ei(SEL-F)). Upon reception of this control signal the in-line element Ei switches on with a predefined maximum gain at a predefined time moment.

In the mean time the network terminator NTi receives also the downstream signal D(G) and recognizes its identification i.e. branch identifier and knows according to the interpretation of the second plurality of bits that its has to execute the function "transmitting a PLOAM cell after a predetermined time delay". After this predetermined delay the network terminator NTi transmits the requested PLOAM cell.

When the PLOAM cell passes the amplifier/splitter AS, the in-line element Ei is switched on with a maximum gain and the PLOAM cell is amplified with a maximum gain and further transmitted towards the optical line terminator OLT.

The burst mode receiver BMRX is ready to receive the PLOAM cell and forwards the PLOAM cell to the electrical line terminator ELT for further processing.

In this way the different functions are indeed executed under the central control of the electrical line terminator ELT by the different network elements i.e. by the network terminator but also by the different in-line elements.

It should be noticed that the term "including", used in the claims and the detailed embodiment, should not be interpreted as being limitative to the means listed thereafter. Thus the scope of the expression "a device including means A and B" should not be limited to devices consisting only of components A and B. It means that with respect to the present invention, the only relevant components of the device are A and B.

Similarly, it is to be noted that the term "coupled", also used in the claims and the detailed embodiment, should not be interpreted as being limitative to direct connections only. Thus, the scope of the expression "a device A coupled to a device B" should not be limited to devices or systems wherein an output of device A is directly connected to an input of device B. It means that there exists a path between an output of A and in input of B which may be a path including other devices or means.

While the principles of the invention have been described above in connection with specific apparatus, it is to be clearly understood that this description is made only by way of example and not as a limitation on the scope of the invention, as defined in the appended claims.

The invention claimed is:

1. A method to perform central control of an in-line element in a tree-like network by a line terminator included in said network together with a plurality of network terminators said method comprising:
   determining by said line terminator a first plurality of bits according to an identification of a selected element and a second plurality of bits according to an identification of a locally predefined function, said selected element being selected out of a set of in-line elements comprising at least said in-line element in order to execute said locally predefined function;
   including by said line terminator in a grant message said first plurality of bits and said second plurality of bits; and
   forwarding said grant message by said line terminator to said selected element forcing execution of said locally predefined function according to said second plurality of bits upon said selected element according to said first plurality of bits,
   wherein at least one network terminator of said plurality of network terminators is coupled via said in-line element to said line terminator by a dedicated branch and a common branch, respectively.

2. The method to perform central control of an in-line element according to claim 1, wherein said determining comprises in said first plurality of bits any one of a network terminator identifier and a branch identifier, said network terminator identifier identifying one of said plurality of network terminators and said branch identifier identifying at least part of said tree-like network.

3. A method to perform central control of an in-line element according to claim 1, wherein said forwarding comprises:
   encapsulating said grant message in a downstream signal; and
   downstream distributing said downstream signal to said plurality of network terminators by said line terminators;
   capturing said grant message out of said downstream signal; and
   forwarding said captured grant message to at least one element controller associated with said selected element forcing execution of said locally predefined function according to said second plurality of bits upon said selected element according to said first plurality of bits.

4. A line terminator perform central control of a plurality of in-line elements in a tree-like network, said line terminator comprises:
   determining means to determine a first plurality of bits according to an identification of a selected element and a second plurality of bits according to an identification of a locally predefined function, said selected element being selected out of said plurality of in-line elements to execute said locally predefined function;
   including means coupled to said determining means to include said first plurality of bits and said second plurality of bits in a grant message; and
   forwarding means coupled to said including means to forward said grant message to said selected element forcing execution of said locally predefined function according to said second plurality of bits upon said selected element according to said first plurality of bits (A), wherein said tree-like network comprises a plurality of network terminators being coupled via said plurality of in-line elements to said line terminator by dedicated branches and a common branch, respectively.

5. The line terminator according to claim 4, wherein said forwarding means includes encapsulating means to encapsulate said grant message in a downstream signal and to distribute said downstream signal to said plurality of network terminators to enable taking in of said grant message out of said downstream signal.

6. An element controller associated to a selected element of a set of in-line elements in a tree-like network, to force execution of a locally predefined function upon said selected element under the central control of a line terminators, said element controller comprises:

recognizing means being coupled to an input of said element controller to receive a grant message transmitted by said line terminator, said grant message including a first plurality of bits being determined by said line terminator according to an identification of said selected element and a second plurality of bits being determined according to an identification of a locally predefined function of said selected element, and said recognizing means (also recognizes in said grant message said first plurality of bits and said second plurality of bits and upon said recognition, generates a control signal for selected element forcing execution of said locally predefined function upon said selected elements, wherein said element controller is coupled in a downstream direction to said line terminator, and said line terminator is being coupled via said set of in-line elements comprising said selected element to a plurality of network terminators by a common branch and dedicated branches, respectively.

7. The element controller according to claim 6, wherein said selected element is a switch-able amplifier for amplifying upstream transmitted signals being transmitted by one of said plurality of network terminators.

8. The element controller according to claim 6, wherein said selected element is a burst mode receiver coupled in said common branch to said line terminator for reception of upstream signals.

9. A tree-like network comprising:
a line terminator;
a common branch;
a plurality of dedicated branch;
a plurality of in-line elements;
a plurality of network terminators being coupled via said plurality of in-line elements to said line terminator by said dedicated branches and said common branch, respectively; and
an element controller associated to a selected element of said plurality in-line elements forcing execution of a locally predefined function upon said selected element under a central control of the line terminator, said element controller comprises:
recognizing means being coupled to an input of said element controller to receive a grant message transmitted by said line terminator, said grant message including a first plurality of bits being determined by said line terminator according to an identification of said selected element and a second plurality of bits being determined according to an identification of a locally predefined function of said selected element, and said recognizing means also recognizes in said grant message said first plurality of bits and said second plurality of bits and upon said recognition, generates a control signal for the selected element forcing execution of said locally predefined function upon said selected element, said element controller is coupled in a downstream direction to said line terminator, wherein said line terminator comprises:
a determining means to determine the first plurality of bits and the second plurality of bits,
including means coupled to said determining means to include said first plurality of bits and said second plurality of bits in said grant message, and
forwarding means coupled to said including means to forward said grant message to the element controller.

10. The method to perform central control of an in-line element according to claim 1, wherein said plurality of in-line elements are positioned on said common link and said dedicated branch between said line terminator and the plurality of network terminals.

11. The method to perform central control of an in-line element according to claim 10, wherein said plurality of in-line elements facilitate transmission of signals from said network terminators to the line terminator and vice versa.

12. The method to perform central control of an in-line element according to claim 11, wherein each of said plurality of in-line elements facilitate transmission of a signal in a portion of a link from said common link and said dedicated link, where said in-line element is located.

13. The method to perform central control of an in-line element according to claim 1, wherein said second plurality of bits identifying said locally predefined function is identifying an operation that said selected element must execute.

14. The method to perform central control of an in-line element according to claim 1, wherein said second plurality of bits determines a type of operation for said selected element to perform.

15. The method to perform central control of an in-line element according to claim 1, wherein said first plurality of bits identifies a selected element, said selected element being a single system component, and wherein said second plurality of bits identifies said locally predefined function, said identified locally predefined function is a type of function said single system component is ordered to execute.

16. The method to perform central control of an in-line element according to claim 15, wherein said second plurality of bits identify a different function depending on said selected element.

17. The method according to claim 1, where said first plurality of bits is a branch identifier identifying at least a portion of the common link and the dedicated link.

18. The method according to claim 3, wherein said capturing is performed by said selected element.

* * * * *